United States Patent
Mammei et al.

(10) Patent No.: US 11,657,846 B1
(45) Date of Patent: May 23, 2023

(54) AUTOMATIC SKEW CALIBRATION CIRCUIT FOR PATTERN-DEPENDENT DYNAMIC WAVE SHAPING FOR HDD PREAMPLIFIER WRITE

(71) Applicants: STMicroelectronics S.r.l., Agrate Brianza (IT); STMicroelectronics, Inc., Coppell, TX (US)

(72) Inventors: Enrico Mammei, Vittuone (IT); Paolo Sanna, Rho (IT); Dennis Hogg, Laguna Hills, CA (US); Edoardo Contini, Milan (IT)

(73) Assignees: STMicroelectronics S.r.l., Agrate Brianza (IT); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 17/710,608

(22) Filed: Mar. 31, 2022

(51) Int. Cl.
  *G11B 20/10* (2006.01)

(52) U.S. Cl.
  CPC .............. *G11B 20/10027* (2013.01)

(58) Field of Classification Search
  None
  See application file for complete search history.

(56) References Cited

U.S. PATENT DOCUMENTS

| | | | |
|---|---|---|---|
| 5,990,710 A * | 11/1999 | Ngo | G11B 5/02 363/63 |
| 6,128,146 A * | 10/2000 | Ngo | G11B 5/012 360/68 |
| 6,466,388 B1 * | 10/2002 | Lacombe | G11B 5/02 360/68 |
| 6,549,353 B1 | 4/2003 | Teterud | |
| 7,154,687 B2 | 12/2006 | Ikekame et al. | |
| 8,169,726 B2 | 5/2012 | Wilson | |
| 8,760,977 B2 | 6/2014 | Wilson | |
| 9,153,248 B1 | 10/2015 | Contreras et al. | |
| 2003/0081339 A1 * | 5/2003 | Barnett | G11B 5/5526 |
| 2003/0204763 A1 * | 10/2003 | Moss | G11C 7/1006 713/400 |
| 2003/0223143 A1 * | 12/2003 | Fujiwara | G11B 5/012 360/68 |
| 2007/0165320 A1 * | 7/2007 | Benakli | G11B 5/02 360/68 |
| 2008/0266696 A1 * | 10/2008 | Dina | G11B 5/012 |
| 2009/0245227 A1 | 10/2009 | Chin et al. | |
| 2014/0355359 A1 * | 12/2014 | Linam | G11C 7/22 365/189.02 |
| 2022/0094345 A1 * | 3/2022 | Okinoi | H03K 5/135 |

* cited by examiner

*Primary Examiner* — Peter Vincent Agustin
(74) *Attorney, Agent, or Firm* — Slater Matsil, LLP (57) ABSTRACT

A method to determine a relative delay between a current-overshoot signal and a write data signal for a hard disk drive preamplifier, the method including using a memory element to strobe a test current-overshoot signal with a test data signal; counting a number of strobed transitions of the test current-overshoot signal; adjusting the delay based on the number of strobed transitions; setting a phase difference between the current-overshoot signal and the write data signal according to the delay; and using the memory element to strobe the current-overshoot signal with the write data signal.

20 Claims, 8 Drawing Sheets

AUTOMATIC SKEW CALIBRATION CIRCUIT FOR PATTERN-DEPENDENT DYNAMIC WAVE SHAPING FOR HDD PREAMPLIFIER WRITE

TECHNICAL FIELD

The present invention relates generally to systems and methods for calibrating a signal delay of a pattern dependent current overshoot for a hard disk drive preamplifier.

BACKGROUND

Generally, current overshoots for hard disk drive writing operations are needed to quickly transition the direction of write current for encoding data on a hard disk drive. The magnitude of the current overshoot needed varies depending on the transition being encoded on the hard disk drive. As a result, current overshooting for hard disk drive writing requires advance notice of upcoming transitions, and an overshoot signal is sent ahead of a data write signal. Due to the very small time window for encoding data, it is advantageous to precisely synchronize the current overshot signal and data write signals.

SUMMARY

In accordance with an embodiment, a preamplifier includes a memory element including a data input, a strobe input, and a data output, the memory element being configured to strobe a data signal received at the data input with a strobe signal received at the strobe input and configured to output a strobed signal at the output; and a calibration circuit coupled with the data output and configured to count transitions in the strobed signal, the calibration circuit including, an enablement counter configured to count transitions of the strobe signal and assert an enable signal in response to a count of the strobe signal exceeding a predetermined number, and a dynamic counter being coupled with the enablement counter to receive the enable signal from the enablement counter, the enablement counter being configured to count transitions of the strobed signal while the enable signal is asserted In accordance with an embodiment a preamplifier includes a memory element including a data input, a strobe input, and a data output, the memory element being configured to strobe a data signal received at the data input with a strobe signal received at the strobe input and configured to output a strobed signal at the output; a current-write circuit configured to receive the strobed signal and generate an overshoot current depending on the strobed signal; and a calibration circuit coupled with the data output and configured to count transitions in the strobed signal.

In accordance with an embodiment, a method to determine a relative delay between a current-overshoot signal and a write data signal for a hard disk drive preamplifier includes using a memory element to strobe a test current-overshoot signal with a test data signal; counting a number of strobed transitions of the test current-overshoot signal; adjusting the relative delay based on the number of strobed transitions; setting a phase difference between the current-overshoot signal and the write data signal according to the relative delay; and using the memory element to strobe the current-overshoot signal with the write data signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

A hard disk drive generally includes a single printed circuit board with most of the controlling electronics contained on this one board. Electrical interface to the disk drive is accomplished through connectors on this printed circuit board. All data bits and control signals transferred to and from a host computer are transferred through this printed circuit board.

Hard disk drive magnetic disks and heads are located inside a sealed clean environment typically called a head-disk assembly (HDA for short). The heads are connected to a moving actuator that typically positions the heads over any one of many concentric circular tracks. The heads connect to an integrated circuit microchip most often called a preamplifier. Signals to and from the disk are processed through the preamplifier. A preamplifier is typically located on the moving actuator. The signals between the printed circuit board and the preamplifier are transmitted through a flexible circuit that can vary in length, but generally is about 7 cm or 8 cm long. This length is needed to allow the moving actuator to rotate to access any of the data tracks on the disk.

Data is encoded on the disk magnetically. The disk surface contains a magnetic layer. The magnetic layer is typically magnetized. The process of recording is accomplished by fully saturating the disk into magnetic regions of opposite polarity (most often up or down) on the disk. The data read and recovery utilizes a very sensitive magnetic transducer that produces a very small electrical signal that is amplified in the preamplifier chip and transmitted to the printed circuit board through the flex circuit. The data information is decoded and transmitted back to the host computer through the printed circuit board.

The information on the disk is encoded by the timing (length or duration) of the magnets on the disk, and not the polarity of the magnets. Ideally, the transition timing is at discrete intervals often described as 1T, 2T, 3T, etc. where T is the reciprocal of the data rate, or timing interval. Typical data rates in modern disk drives are approaching 4 Gb/s with some projections closer to 5 Gb/s. 1T transitions may be 200 to 250 picoseconds apart resulting in very small magnets. Longer duration 3T, 4T, 5T, etc write timings result in larger magnets being written to the disk. The data is encoded in the resulting length of the magnets. As will be appreciated, for precision the timing must be controlled to a very small fraction of the window. Typically, less than 10 pS.

The write process is accomplished by transmitting a current through a small coil in the head. Transitions are recorded by reversing the electrical current direction in the head. During the write process, encoded data is transmitted from the printed circuit board to the preamplifier through a differential pair transmission line. The preamplifier converts the differential pair voltage signal into a differential current and drives the current through the write coil in the head. Variations in propagation delay and timing of the signal transitions are carefully controlled.

As data density increases, the magnets on the disk become smaller. Magnetic interference between small magnets (1T) and adjacent larger magnets (3T, 4T, 5T or larger) may alter the desired magnetic transition locations on the disk. It becomes necessary to pre-compensate transition timing depending upon the pattern of the data. For example, timing shifts may be needed to compensate for interference among small written magnets when transitions occur in close proximity to larger magnets. Timing shifts may be needed when short magnet (1T) transitions occur in close succession before or after a long transition interval. The clock in the chip on the printed circuit board is typically made from a ring oscillator so many clock phases are available and by mixing phases, delays with very fine granularity are possible. A pattern dependent write pre-compensation circuit is available.

Due the small time windows and precise technological demands, it is necessary to transition the current direction very rapidly. And, the faster the data write, the greater magnitude write current needed to produce a well defined magnetic transition. Each write current pulse has an overshoot current that is often double the write current. Write current and overshoot current are closely controlled. If the current is too small, the magnetic transitions are not well defined and result in transition time noise in the read-back signal. If the current is too large, the written pulses become too wide and corrupt transitions on adjacent data tracks.

The magnitude of the current overshoot also needs to be tailored to the data being written. The current required to properly write a 1T transition far exceeds the current required to write a 2T, 3T or 4T transition. If the same write current magnitude is used to properly write 1T and the longer patterns 2T, 3T or 4T, then the longer patterns write too wide and corrupts adjacent tracks of data. And, as data rates continue to increase, this may become more problematic and many more write current parameters may need adjusting based upon the write data pattern.

To address this, the magnitude of write current is varied depending on the data pattern. Often, the same circuit used to generate write pre-compensation timing is used to generate a second differential signal output from the printed circuit board that indicates whether the upcoming write transition should have a large or a small write current overshoot.

Pattern dependent write requires a second signal pair from the printed circuit board to the preamplifier. The second signal pair will transmit information that allows the preamplifier to adjust some attribute(s) of the write current for the upcoming pulse. However, to coordinate the transition timing signal with the current overshoot, the current-overshoot pattern signal must precede the write current to provide enough time for internal electronics to respond to the pattern signal. The pattern signal also cannot be too far ahead of the timing signal because another write data signal may occur within less than loops.

The two signal pairs (write data transitions and current-overshoot pattern data) may have different propagation delays in the signal path due to variations in circuit components and differences in length of the signal traces. One centimeter of signal trace length may result in 65 pS delay, so minor differences in trace lengths make a delay calibration feature necessary.

The write-data transition timing and current-overshoot pattern signals, thus, need to be properly time-skewed to coordinate the current overshoot with the transition timing. Differences in propagation time may be due to setup and hold time of a memory element used by the preamplifier for sampling, the SoC driver path, the transmission line, and the preamplifier signal processing chain. Better approaches to calibrate the relative delay between the write-data transition signal path and current-overshoot pattern signal path are needed.

Figure 1:
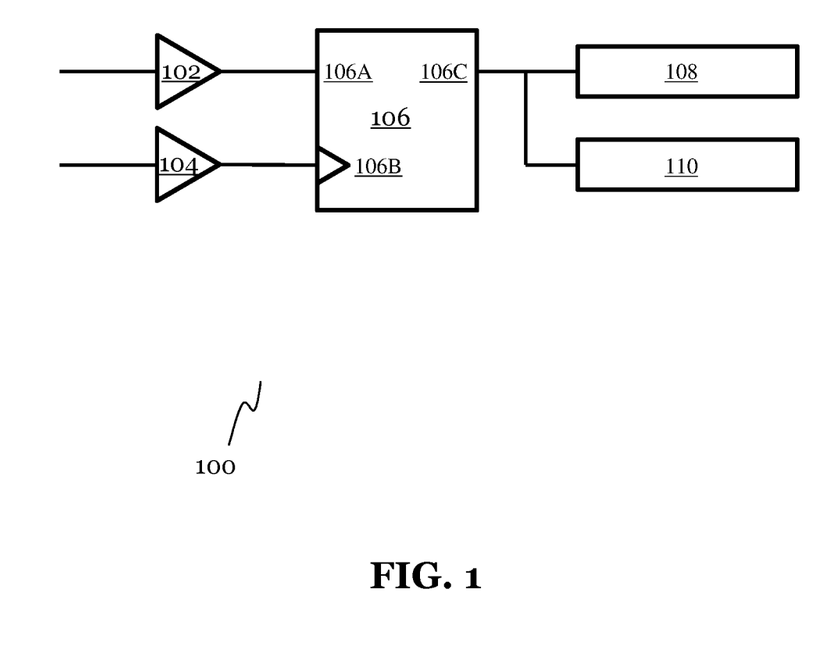
FIG. 1 depicts a preamplifier circuit in accordance with embodiments.

FIG. 1 depicts a preamplifier circuit in accordance with embodiments.

In various embodiments, a preamplifier 100 may comprise a receiver 102. The receiver 102 may receive a differential signal. The receiver 102 may output a digital signal. The receiver 102 may be disposed on a current-overshoot data path. The differential signal may be provided by a System on Chip (SoC). The preamplifier 100 may comprise a receiver 104. The receiver 104 may be disposed on a write-data transition signal data path. The receiver 104 may receive a differential signal. The receiver 104 may output a digital signal. The differential signal provided to receiver 104 may be provided by a SoC. The receiver 102 and the receiver 104 may be matched.

In various embodiments, the preamplifier wo may further comprise a memory element 106. The memory element may comprise a data input 106A and a strobe input 106B. The memory element 106 may be configured to latch data received at the data input 106A on the rising edge of a signal received at the strobe input 106B. In various embodiments, this may allow memory element 106 to strobe the data signal received at data input 106A with the a strobe signal received at 106B and output a strobed signal at an output 106C. The memory element 106 may also be configured to latch data received at the data input 106A on the falling edge of a signal received at the strobe input 106B. As will be appreciated in various embodiments a bi-directional clock latch may be implemented with two identical one-directional clocked latches. Swapping positive and negative clock inputs makes a second latch active on an opposite transition direction of write data.

For writing to a hard disk drive, a write-data transition signal may be provided to the strobe input 106B to time a current-overshoot pattern signal provided to data input 106A. The current-overshoot signal, which may indicate the magnitude of the overshoot needed for the upcoming transition can thus be synchronized with transitions indicated by the write-data transition signal provided an appropriate skew between the signals accounts for any differences in propagation delays.

The output 106C of the memory element 106 may be provided to a current-write circuit 108 where it may be delivered to circuitry for generating the write current pulse in accordance with the magnitude indicated by the current-overshoot pattern signal. As will be appreciated, the strobed signal having been sampled according to the write-data transition signal may be synchronized with the write-data transitions when an appropriate relative time skew. The current overshoot, in various embodiments, may comprise a binary choice between applying overshoot or not applying an overshoot. In various embodiments, the current overshoot may be provided for 1T transitions. However, it will be appreciated, that a current overshoot may be provided for 2T or 3T transitions. And, in various embodiments, the current overshoot may have different magnitudes depending on the transition.

For calibration of the time skew, the output 106C of the memory element 106 may also be provided to a calibration circuit coupled with the output 106C. When enabled, the calibration circuit no may count transitions in the strobed signal. The count may be used to indicate whether the time skew between the current-overshoot pattern signal and the write-data transition signal needs to be adjusted. For example, a signal with a known number of transitions may be input to the strobe input 106B. A time-skewed duplicate may also be provided to the data input 106A. The transitions of the strobed signal output by memory element 106 may be counted to determine if it matches the known number of transitions provided to the strobe input 106B. The delay between signals between provided to the data input 106A and the strobe input 106B may be iteratively adjusted until the number of transitions counted by the calibration circuit no matches the number of transitions of the known signal provided to the strobe input 106B. In other embodiments, data may be collected over multiple iterations, with each iteration comprising a different relative delay. The results may be stored and analyzed to select an appropriate time skew based on the results.

As will be appreciated, data signals arriving at the data input 106A may need to be provided to the memory element ahead of a strobing signal provided to the strobe input 106B to account for setup and hold times of the memory element. The calibration circuit no in the preamplifier 100 uses the same memory element for calibrating the time skew that is later used to sample the current-overshoot data signal. This may be advantageous because calibration is performed using the same components for operation and calibration, which allows the time skew to be more accurately tailored to the components functionally used. This may also be true with respect to other variations in propagation delays between signals provided to the data input 106A and strobe input 106B (such as the receiver 102 and the receiver 104). Disposing the calibration circuit no in the actual write path, allow the calibration circuit to precisely account for variations in propagation delay introduced by the components used for generating the write current.

In various embodiments, write-current data signals and a current-overshoot signals may include a preamble signal to reject start-up transient both on the SoC that provides signals and from the preamplifier to allow read-back data synchronization. The preamble pattern may be 2T (half a maximum frequency) and may not be usable for pattern calibration. It may be beneficial to delay calibration until after the preamble section. The calibration circuit may first ignore a preamble, which may be a variable length, then count the successful sampling within a specified number of bit transitions.

Figure 2:
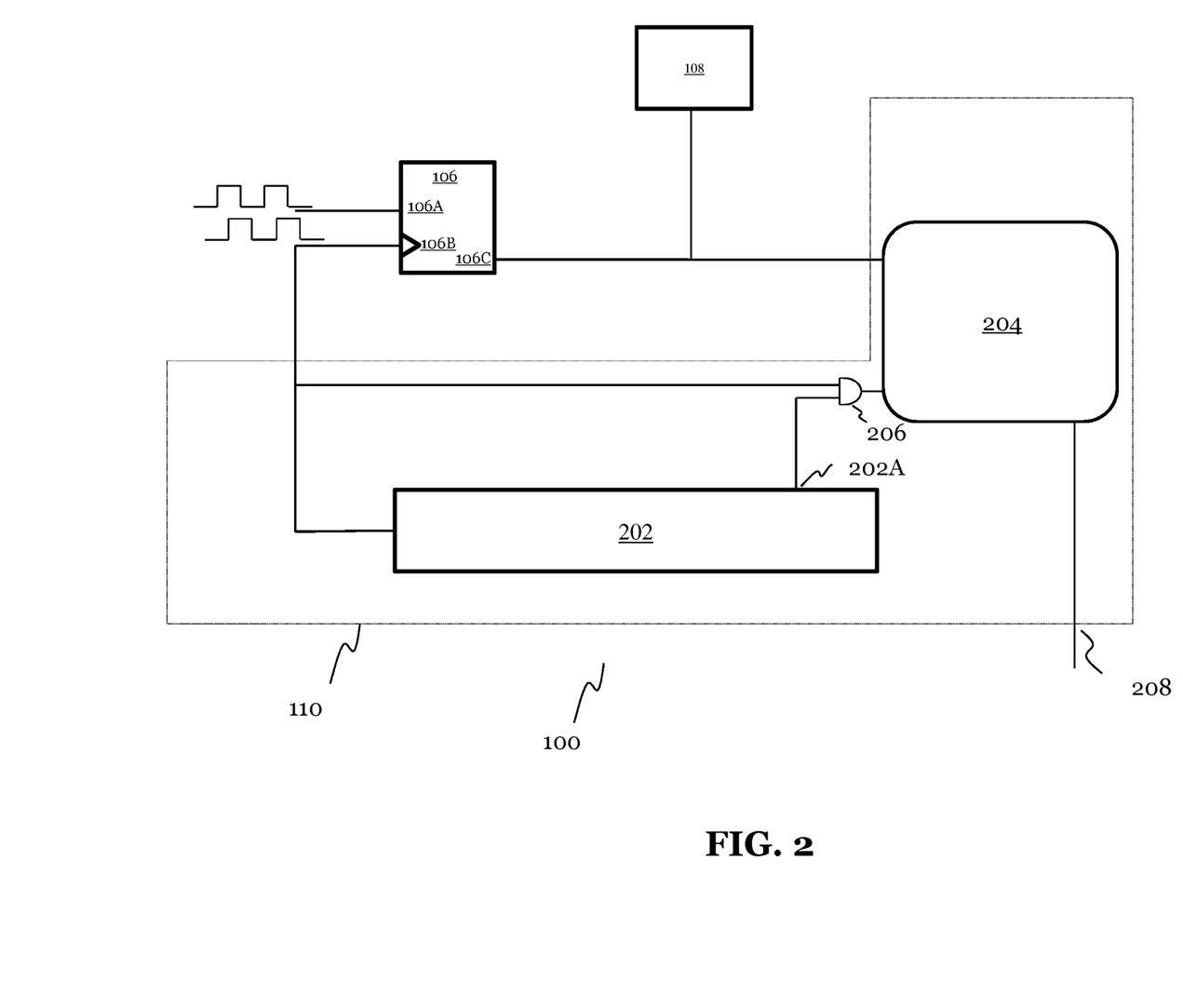
FIG. 2 depicts a preamplifier in accordance with embodiments.

FIG. 2 depicts a preamplifier consistent with embodiments.

As will be appreciated a calibration circuit may comprise different forms in different embodiments. FIG. 2 should not be taken to limit application of this disclosure. Unless otherwise noted, the same reference numbers may be used to describe the same components throughout the figures of this disclosure. For the sake of brevity, redundant explanations are not repeated.

In various embodiments the calibration circuit no of the preamplifier 100 may comprise an enablement counter 202 and a dynamic counter 204. The enablement counter may be coupled with the dynamic counter to enable the dynamic counter 204. The enablement counter may output an enablement signal at an enablement output 202A. In various embodiments, counting by the dynamic counter 204 may be enabled and disabled by the enable signal. As will be appreciated, this may be accomplished in different ways in various embodiments For example, the enable signal may be gated with other another signal used by the dynamic counter 204. In various embodiments, the enablement signal may be provided to an input of an AND gate 206.

After a calibration test has been initiated, it may be advantageous to delay initiation of a count of until a preamble length has passed. During calibration, a SoC may provide a test write-data transition signal and a test current-overshoot pattern signal. The test current-overshoot pattern signal may be phase-shifted duplicate of the test write data transition signal. The test current-overshoot signal may be provided to data input 106A and the test write-data transition signal may be provided to strobe input 106B. In various embodiments, the test current-overshoot signal may be provided to strobe input 106B and the test write-data transition signal may be provided to data input 106A For calibration, transitions of the test current-data overshoot signal may be counted. The enablement counter 202 may be coupled with the strobe input 106B to also receive the test write-data transition signal. This may allow the enablement counter 202 to count transitions (or pulses) of the test write-data transition signal to delay enablement of the dynamic counter 204 until after the preamble has passed. Likewise, this may allow the enablement counter to disable the dynamic counter 204 once a the desired length of the test write-data transition signal has been reached.

After being enabled, the dynamic counter 204 may count the transitions of the test current-overshoot signal after it has been strobed by the test write-data transition signal. The dynamic counter 204 may be coupled with the output 106C of the memory element 106 for counting the strobed signal. In various embodiments, the test write-data transition signal may be used to time the count performed by the dynamic counter 204. The test write-data transition signal may, thus, be provided to the dynamic counter 204 when counting is enabled. This may be accomplished, in various embodiments, by coupling an input of the AND gate 206 with the test write-data transition signal along and an input of the AND gate 206 with the enable signal.

The dynamic counter may provide the results of the count at an output 208 of the calibration circuit. The results of the count may be analyzed to determine whether more or less delay is needed to synchronize signals. In various embodiments, this may comprise comparing the number of pulses counted by the dynamic counter with the known number of pulses of the test data-write transition signal. In various embodiments, the a test, or iteration of the test, may be considered successful when all the pulses of the write-data transition signal are captured by the strobed output. In various embodiments, iterations may be repeated with varying delays to find a delay range where the write data transition signal is correctly detected by the preamplifier chip. The range may comprise a minimum boundary and a maximum boundary. For writing, a delay may be selected between the minimum boundary and the maximum boundary. In various embodiments, a user may select a delay between a minimum boundary and a maximum boundary. In various embodiments, a delay may be algorithmically determined. For example, a midpoint between minimum boundary and maximum boundary may be selected as the delay.

Figure 3:
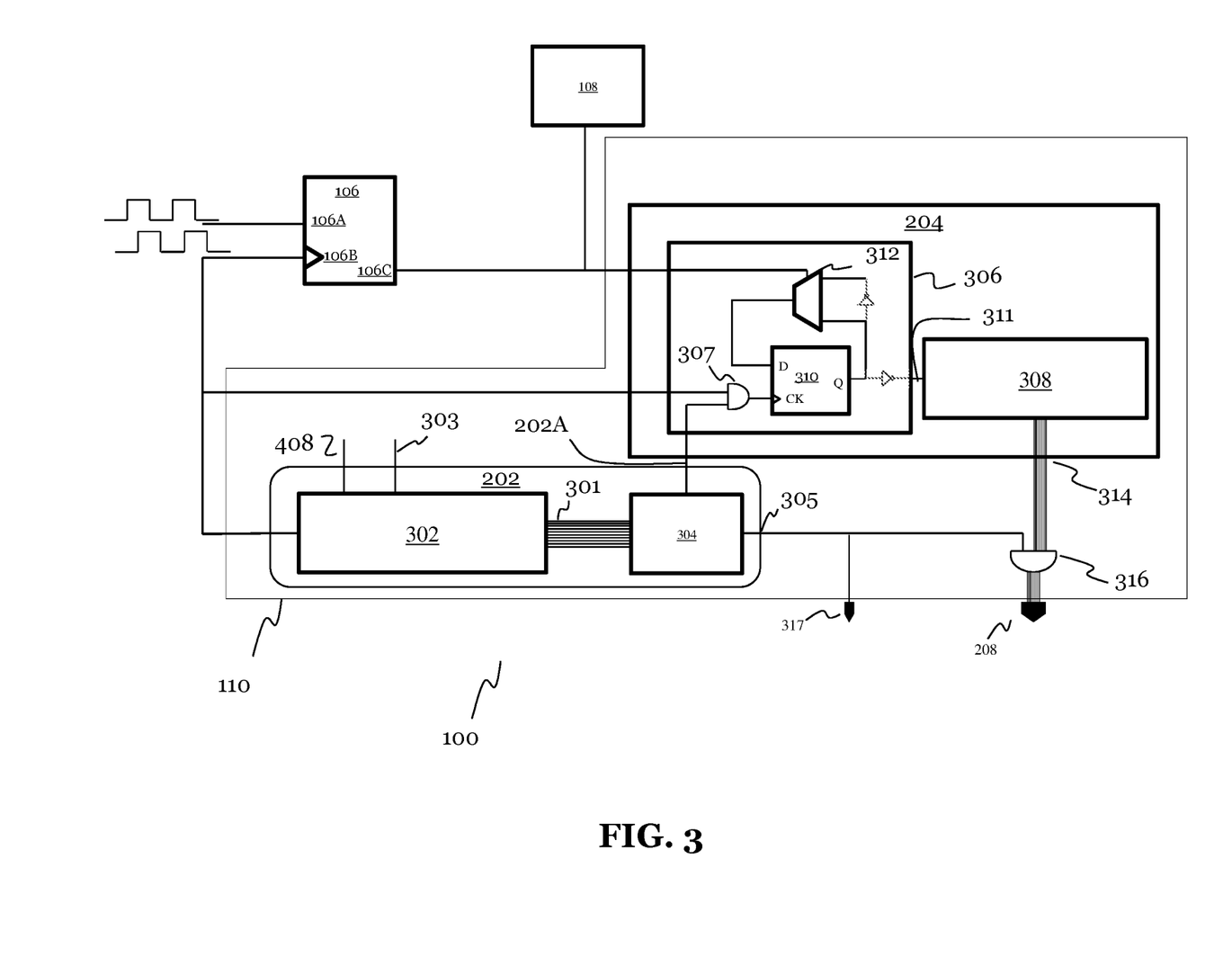
FIG. 3 depicts a preamplifier in accordance with embodiment.

FIG. 3 depicts a preamplifier of an embodiment.

As will be appreciated the enablement counter 202 and the dynamic counter 204 may be implemented in various ways in various embodiments. The enablement counter 202 may comprise a frequency division counter 302. The enablement counter 202 may further comprise an enablement-calibration circuit 304 coupled with the outputs 301 of the frequency division counter 302. The frequency division counter 302 may comprise an output for some, or all, of the bits of the counter. For example, a ten-bit counter may comprise an output for each of the ten-bits. The number of bits of the frequency-division counter may correspond to a number of flip flops used in the frequency division counter 302. The number of bits of the frequency division counter 302 may vary in various embodiments.

The enablement-calibration circuit 304 may be coupled with the outputs of the frequency division counter 302. The frequency division counter 302 may be coupled with the strobe input 106B to receive the same data signal as the strobe input 106B. For example, the test write-data transition signal. The frequency division counter 302 may thus count the transitions of the write-data transition signal while the memory element 106 is strobing the test current-overshoot signal.

As the count of the frequency division counter 302 progresses and is output to the enablement-calibration circuit 304, the count may trigger the enablement circuit to enable and disable the dynamic counter 204. After a number of transitions corresponding to a preamble has passed, the count output to the enablement-calibration circuit 304 may trigger enablement of the dynamic counter 204. After the count output by the frequency division counter 302 has passed a number corresponding to an end of an iteration of a calibration test, the enablement-calibration circuit 304 may disable the dynamic counter 204. In various embodiments, the enablement-calibration circuit 304 may output a validity bit at a validity bit output 305. The validity bit may indicate whether the count has progressed far enough to generate a valid calibration result.

By way of a non-limiting example, the a test write-data transition signal may comprise a 32-bit preamble and 256 additional bits. The enablement-calibration circuit 304 may enable the dynamic counter 204 after the count passes 32. It may be determined, for various embodiments, to consider an iteration valid after 128 bits of data have been counted. The validity bit may be asserted 128 counts after the dynamic counter 204 is enabled. 256 counts after the dynamic counter 204 is enabled, the enablement-calibration circuit 304 may disable the dynamic counter 204 thereby ending an iteration of a calibration test. In various embodiments, the preamble may be variable. It may be set by user input.

The dynamic counter 204 may comprise a dynamic clock gating circuit 306 and a frequency division counter 308. When enabled by the enablement counter 202, the dynamic clock gating circuit 306 may receive the same signal provided to strobe input 106B. As depicted in FIG. 2, in various embodiments, an enable signal produced by the enablement counter 202 may be provided to AND gate 307, which may also be coupled at an input with the strobe input 106B to receive the same input signal provided to the strobe input 106B. This may be used to time the potential count of the dynamic counter 204 so that it is in step with the memory element 106 and the enablement counter 202. It should be appreciated that the AND gate 307 may be disposed outside the dynamic clock gating circuit 306 and outside dynamic counter 204.

The dynamic counter 204 may also be coupled with the output 106C of the memory element 106 to receive the strobed signal to allow the strobed signal to be counted. As will be appreciated, the dynamic counter 204 may comprise different forms in various embodiments for counting the strobed signal. For example, in various embodiments the dynamic clock gating circuit 306 may provide a data input for the frequency division counter 308 at an output 313. And, the data input for the frequency division counter 308 may thus be toggled depending on the state of the strobed signal so that the a count will only be recorded when the strobed signal reflects a transition. The output 313 of the dynamic clock gating circuit 306 may be toggled between a clock-increment state and a clock-hold state by the strobed signal clock-increment state and a clock-hold state where the frequency division counter 308 may be inhibited when the output is in a clock-hold state and allowed to count when in a clock-increment state.

In various embodiments, the dynamic clock gating circuit 306 may comprise a memory element 310, and a MUX 312. The memory element 310 may comprise a D flip flop. When enabled by the enablement counter 202, the memory element 310 may receive the test write-data transition signal at a clock input CK. This data input D of the memory element 310 will thus be sampled in step with the memory element 106 and the count of the enablement counter 202. The output Q of the memory element 310 may be provided to MUX 312. The output Q may be inverted and provided to the input of the MUX 312. The output of the MUX 312 may be supplied to the data input D of the memory element 310. The output Q may be inverted and output at an output 311 to the frequency division counter 308 as a clock signal for the frequency division counter 308.

A selection input of the MUX 312 may also be coupled with the output 106C of the memory element 106. As will be appreciated, this allows a strobed signal output by the memory element 106 to toggle the output of the MUX 312, which in turn can cause the frequency division counter 308 to increment its count when indicated by the strobed signal but not otherwise. In this way, the dynamic counter 204 may be incremented when a transition has been captured by the strobed signal. When the signals provided to data input 106A and strobe input 106B are in synch with an appropriate delay the frequency division counter 308 may be incremented on each pulse of a signal provided to the clock input CK of the memory element due to toggling of the MUX 312. If the signals are out of synch, then the MUX may be toggled so that frequency division counter 308 is not incremented along with all of the pulses of the a signal provided to the clock input CK of the memory element 310. The count recorded by the frequency division counter 308, may, thus accrue only with pulses of test current-overshoot signal that are sampled successfully by the memory element 106. The dynamic counter 204 may output the count at an output 314. Output 314 may comprise a bit for each bit of frequency division counter 308. The output of the dynamic counter 204 may be gated with the validity bit. For example with AND gate 316. This may be advantageous to prevent users from reading erroneous data from partial test sequences or reading results before a test sequence is complete. Dynamic Clock gating may be beneficial to implement the counter in digital fashion to make calibration robust to noise and jitter. The count from the dynamic counter 204 may be output. The validity bit may also be gated with the output of the dynamic counter 204. The validity bit may also be provided to output 317.

If needed, the relative delay between the current-overshoot data signal and the write-data transition signal may be adjusted depending on the result of a count output by the dynamic counter 204. If the count is lower than desired, the relative delay between the current-overshoot data signal and the write-data transition signal may be adjusted. This may comprise adding more time to the relative delay. This may comprise removing time from the relative delay. Another iteration of the calibration test may then be performed using the new relative delay between a test write-data transition signal and a test current-overshoot signal. Calibration may continue until a count recorded by the dynamic counter 204 is acceptable. For example, the calibration test may continue to iterate until each pulse of the test write-data transition signal is successfully sampled by the strobed data signal output by output 106C.

A calibration test may also sweep a desired time period to identify a range of delays. This may be accomplished by performing a number of iterations with each iteration testing a different delay.

In various embodiments, two calibration sequences may be performed. One calibration sequence may be used to for positive edges and another for negative edges. For the positive-edge calibration sequence a test data-write transition signal may be provided to strobe input 106B. For negative-edge calibration, the test data-write transition signal may be inverted and provided to strobe input 106B. As with positive edge calibrations, a test may comprise multiple iterations with varying delays to find a range where the pattern signal is correctly detected by the preamplifier chip. The range for the negative edge may comprise a minimum boundary and a maximum boundary. A delay may be set within the boundaries for the positive edge and the negative edge. For setting a delay, in various embodiments, a midpoint may be selected between a delay determined from positive edge calibration and a delay determined from negative-edge calibration.

Figure 4:
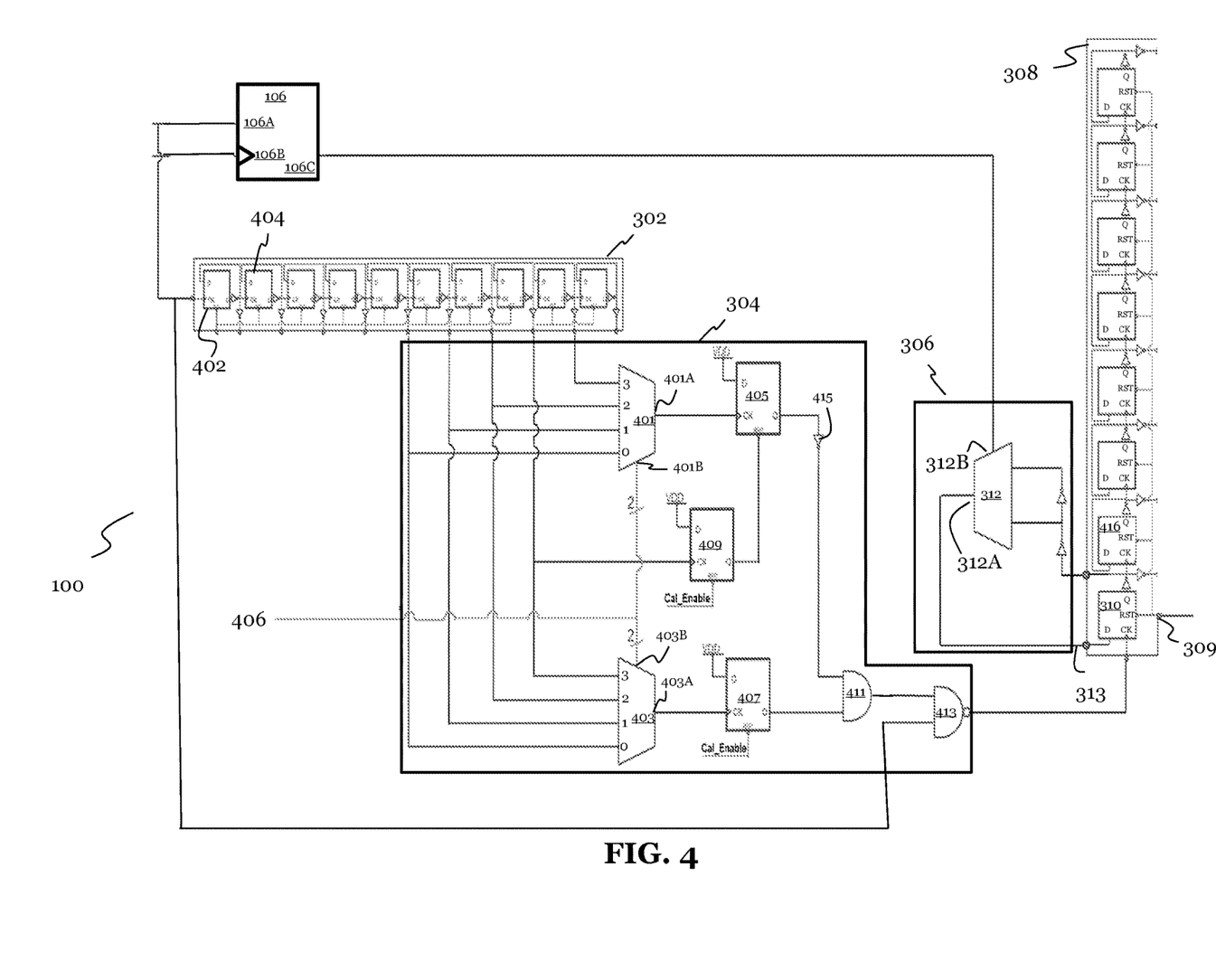
FIG. 4 depicts a preamplifier in accordance with embodiment.

FIG. 4 depicts a preamplifier in accordance with an embodiment.

In various embodiments, the frequency division counter 302 may comprise a ten-bit counter, although different size counters may be used in various embodiments. As will be appreciated, a number of flip flops (or other memory elements) may correspond to the number of bits of the frequency division counter 302. For example, a ten-bit counter may comprise ten flip flops. In various embodiments, the frequency division counter 302 may comprise an output for each bit of the counter.

A first memory element 402 of the frequency division counter 302 may receive the same input at strobe input 106B. This may be received at a clock input of the first memory element. The first memory element 402 may correspond to the least significant bit of the frequency division counter 302. The output of the first memory element may be inverted and provided to the data input of the first memory element 402. The inverted output of the first memory element may also be provided to a clock input of a second memory element 404. The second memory element may correspond to a second bit of the frequency division counter 302. Additional memory elements corresponding to additional bits may be coupled in a chain with the inverted outputs of the memory elements being fed back to the data inputs of the respective memory elements and being coupled with the clock inputs of the next memory elements in the chain. As will be appreciated, this describes but one embodiment of a frequency-division counter and other counter may be utilized in various embodiments.

In various embodiments, the enablement-calibration circuit 304 may comprise a first MUX 401, a second MUX 403, a first memory element 405, a second memory element 407, a third memory element 409, an AND gate 411, and a NAND gate 413. Any or all of the first memory element 405, the second memory element 407, and the third memory element 409 may comprise D flip flops.

In various embodiments, the first MUX 401 may comprise a 4-to-1 MUX. The second MUX 403 may comprise a 4-to-1 MUX. The second MUX 403 may receive the outputs from the $5^{th}$, $6^{th}$, $7^{th}$, and $8^{th}$ bits of the frequency division counter 302. The first MUX may receive output from the $5^{th}$, $6^{th}$, $7^{th}$, and $9^{th}$ bits of the frequency division counter 302. The first memory element 405 may be coupled at a clock input with the output of the first MUX 401. The second memory element 407 may be coupled at a clock input with the output of the second MUX 403. A calibration enable signal may be coupled with a reset of the second memory element 407 and with a reset the third memory element 409. The calibration enable signal may be asserted when a calibration test begins or an iteration of a calibration test begins.

A clock input of the third memory element 409 may be coupled with the $8^{th}$ bit of the frequency division counter 302. A data input for the first memory element 405 may be coupled with VDD. A data input for the second memory element 407 may be coupled with VDD. A data input for the third memory element 409 may be coupled with VDD. An output of the third memory element 409 may be coupled with a reset of the first memory element. An output of the second memory element 407 may be coupled with AND gate 411 at an input of the AND gate 411. An inverted output of the first memory element 405 may be coupled with AND gate 411 at an input. An inverter 415 may invert the output of the first memory element 405. An output of AND gate 411 may be coupled with an input to NAND gate 413. NAND gate 413 may also receive at an input the same signal provided to strobe input 106B, which may comprise a test write-data transition signal is enabled. A selection input 401B for the first MUX 401 may be configured to receive a selection signal to toggle the output of the first MUX 401. A selection input 403B may be configured to receive a selection signal to toggle the output of the second MUX 403. The selection input 403B and selection input 401B may be coupled with the same two-bit selection signal 406.

The two-bit selection signal may be used to indicate the length of a preamble to be ignored. As will be appreciated, a longer selection signal may be used in various embodiments depending on number of inputs for a MUX or MUXes used. The two-bit selection signal 406 may be provided by a system on chip (such as system on chip 502). Depending on the value of the two bit selection signal 406, the count of the dynamic counter 204 may enabled at different times.

The first MUX 401 may comprise 4 inputs: a first input 0, a second input 1, a third input 2, and a fourth input 4. The second MUX 403 may comprise 4 inputs: a first input 0, a second input 1, a third input 2, and a fourth input 4. As will be appreciated, the output selected for the second MUX 403 may determine when the dynamic counter 204 is enabled and the output of the first MUX 401 may determine when the count is disabled. The length of the count may depend on the input for the third memory element 409. The first memory element 405 may comprise a flip flop. The second memory element 407 may comprise a flip flop. The third memory element 409 may comprise a flip flop.

By way of example, the first input 0, the second input 1, the third input 2, and the fourth input 3 of the second MUX 403 may be coupled with outputs of the $5^{th}$, $6^{th}$, $7^{th}$, and $8^{th}$ bits of the frequency division counter 302, respectively. The first input 0, the second input 1, the third input 2, and the fourth input 3 of the first MUX 401 may be coupled withe outputs of the $5^{th}$, $6^{th}$, $7^{th}$, and $9^{th}$ bits of the frequency division counter 302, respectively. The two-bit selection signal 406 may be set so the first MUX 401 outputs its first input 0 and so the second MUX 403 outputs its first input 0 at their respective outputs.

Continuing with the example, when the frequency division counter 302 asserts the output of the fifth bit for a first time, second memory element 407 may be set. However, first memory element 405 may be prevented from being set by third memory element 409. This may enable assertion of the enable signal for the dynamic counter, which will begin its count. The third memory element 409 may continue to inhibit setting of the first memory element 405 until the third memory element 409 is set. The third memory element 409 may be set, for this example, when the $8^{th}$ bit is asserted. And, on the next assertion of the $5^{th}$ bit after assertion of the $8^{th}$ bit, the first memory element 405 may be set, which in turn disables the count of the dynamic counter 204. In this way, the dynamic counter 204 is enabled by assertion of the fifth bit and disabled by a subsequent assertion of the fifth bit where the interval is determined by assertion of the $8^{th}$ bit. As will be appreciated the length of the interval (or the count) may vary in various embodiments. This may be accomplished by providing a different bit for the clock input of the third memory element 409. As will be appreciated, using the two-bit selection signal, the dynamic counter 204 may be enabled at different point in the count of the frequency division counter, which allows different lengths of a preamble to be ignored.

The two-bit selection signal 406 (also may be referred to as a preamble selection signal) may be set to select the fourth input 3 of the second MUX 403 as its output and the fourth input 3 of the first MUX 401 as its output. In this example, the second MUX 403 may set the second memory element 407 when $8^{th}$ bit of the frequency division counter 302 is asserted, which may enable the dynamic counter 204. The third memory element 409 may also be set at the same time to remove the inhibition for setting the first memory element 405. And, on next assertion of the $9^{th}$ bit of the frequency division counter 302, the first memory element 405 may be set thereby disabling the dynamic counter.

As will be appreciated, the enablement counter 202 may comprise various forms in various embodiments. It may be advantageous to implement the enablement counter 202 with a single counter (such as depicted in FIG. 4) with a calibration circuit. Flip flops or other memory elements utilized in frequency division counters may comprise high performance flip flops to account for high frequency performance of the frequency division counter. Using enablement-calibration circuit 304 may allow reduction of the number of high performance flip flops utilized in an embodiment. In various embodiments, the first memory element 405, second memory element 407, and third memory element 409 may comprise flip flops that have relaxed speed requirements. The enablement-calibration circuit 304 may also be beneficial for area reduction by allowing implementing the enablement counter 202 with only one counter. Automatic recognition of the enablement-calibration circuit 304 may also be beneficial to provide flexibility to a user to vary calibration patterns. It should also be appreciated that the calibration circuitry may be implemented in a variety of ways and FIG. 4 provides but one example.

In various embodiments, the configuration of frequency-division counter 302 may allow lower speed memory flip flops for higher bits. In most counters, the input clock signal is connected to all flip flops in the counter. This may be advantageous when all flip flops are synchronous. In various embodiments of the frequency-division counter 302, output of each flip flop may be used as the clock of the next stage. Each successive stage operates at lower and lower frequencies allowing the later stages of the counter to be in slower and slower (smaller and cheaper) logic implementation. Race conditions may not exist in some implementations because, in various embodiments, outputs from bits of the frequency division counter 302 are not simultaneously used, and all but the first few flip flops of the frequency-division counter 302 and all of the logic in the enablement-calibration circuit 304 may be implemented in small inexpensive logic gates.

The enablement counter 202 may be configured in different ways to allow a single counter to perform the preamble counting and test counting performed by the enablement counter. In various embodiments, enablement of the dynamic circuit may be triggered when the count of the frequency division counter 302 reaches a desired number. Data may be preloaded into a frequency division counter 302 to initialize a count at a chosen value thereby reducing the number of counts needed to reach the triggering value for enablement of the dynamic counter 204. As will be appreciated, the frequency-division counter may be loaded with a value that depends on a length of a preamble so that the preamble is ignored by the count of the dynamic counter 204.

Figure 8:
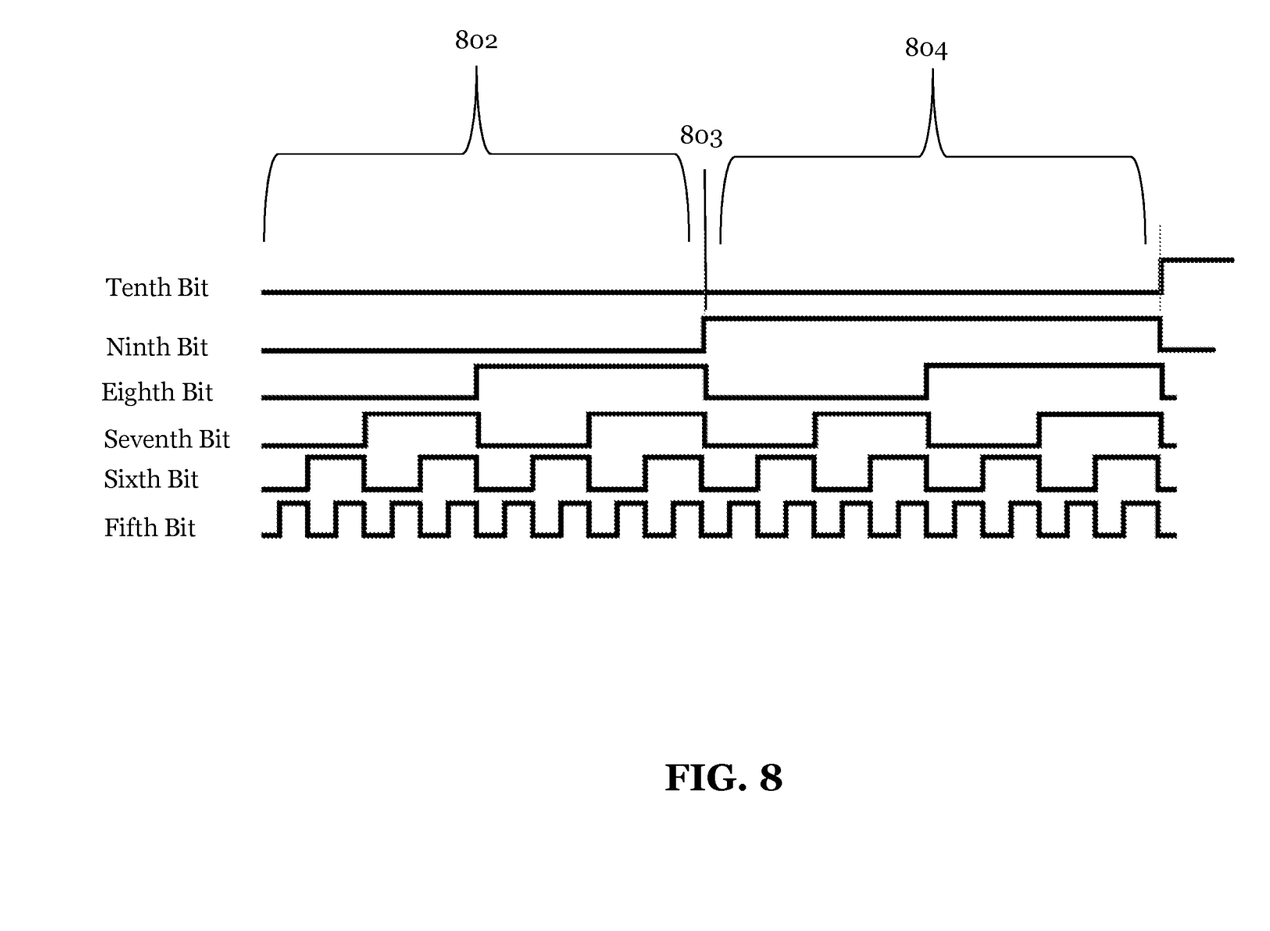
FIG. 8 depicts output waveforms for a frequency division counter in accordance with an embodiment.

FIG. 8 depicts output waveforms for a frequency division counter in accordance with an embodiment.

FIG. 8 depicts output waveforms of the frequency division counter 302 for a fifth bit, sixth bit, seventh bit, eighth bit, ninth bit, and tenth bit of a ten-bit frequency division counter. The lower bits of the counter are not depicted in FIG. 8 for compactness, and it will be appreciated that each successive bit comprises twice the frequency of the preceding lowest bit in accordance with operation of a frequency division counter.

The frequency division counter 302 may be preloaded with data to place it in an initial state anywhere in the delay period 802. This may depend upon the number pre-loaded into the frequency division counter 302. The enablement-calibration circuit 304 may comprise circuitry to keep the enablement signal at a disabled state while the frequency division counter 302 is in the delay period 802 (or inhibit assertion of the enable signal). Such circuitry may comprise logic in various embodiments.

After counting from the pre-loaded number in the frequency division counter to 256, the ninth bit may be set. After the ninth bit is set, then the measuring period begins where the enable signal provided to the dynamic counter 204 is asserted. In response to assertion of the ninth bit, the enablement-calibration circuit 304 may assert the enablement signal thus enabling the frequency division counter 308 to count times when 106C is strobed high. Counting will continue throughout the measurement period 804 while the counter is high. The enablement-calibration circuit 304 may comprise circuitry to keep the enablement signal at an enabled state while the frequency division counter 302 is in the measurement period 804. Such circuitry may comprise logic in various embodiments.

When the count of counter reaches 512, the tenth bit may be asserted and the sequence may be halted. The enablement counter 202 may comprise circuitry to halt the count after the tenth bit is asserted. For example, the output of the tenth bit may be inverted and gated with the test write-data transition signal before the test write-data transition signal is coupled with the first memory element 402 of the first bit of the frequency division counter 302. Such circuitry may comprise logic in various embodiments. In various embodiments, the counter may not wrap around to zero and continue to count. This last bit set, bit 10 may also serve to report that a successful measurement is complete. After a count is complete, the user may read the value in frequency division counter 308 and then clears all counters with calibration enable signal. The frequency division counter 302 may be pre-loaded with the desired delay for a next iteration. In various embodiments, the calibration enable signal may be provided to a reset input 303 (as depicted in FIG. 3) for the frequency division counter 302. The enablement-calibration circuit 304 may comprise any circuit that produces an enable signal that behaves as described herein. In some embodiments, the enablement-calibration circuit 304 may comprise an AND gate coupled at in input with the test data-write transition signal, the output of the ninth bit of the frequency division counter, and an inverted output of the tenth bit of the frequency division counter 302.

Figure 5:
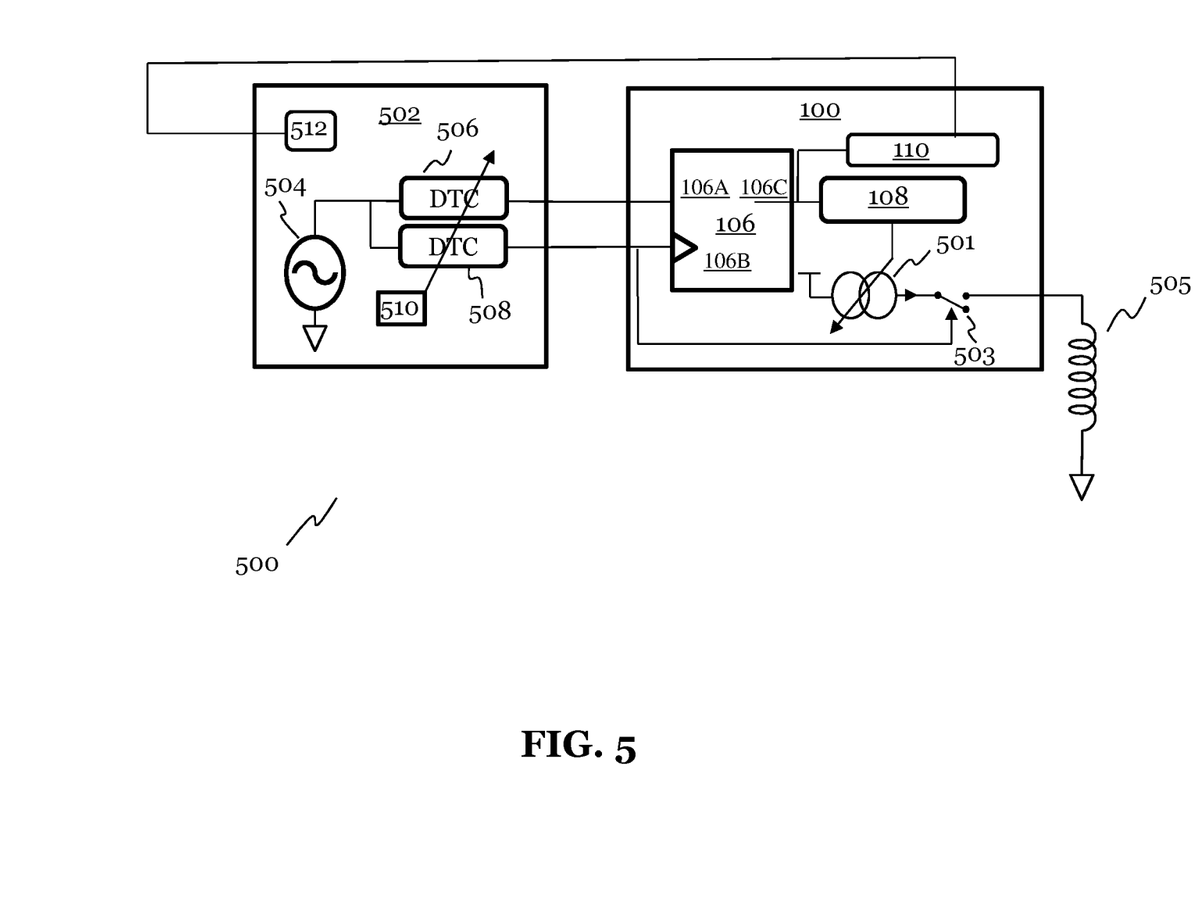
FIG. 5 depicts a system to write to a hard disk drive in accordance with an embodiment.

In various embodiments, the frequency division counter 302 may comprise an input 408 for pre-loading data into the frequency division counter 302. The input 408 may comprise a ten-bit input in various embodiments wherein the frequency division counter 302 comprises a ten-bit counter. As will be appreciated, the input may comprise more or less bits in various embodiments. Internal bussing may be utilized to preload data to the flip flops of the frequency division counter. The calibration enable signal and the preload data may be provided from a system on chip 502 (for example from processor 512).

It should be appreciated that the number of bits of the frequency division counter 302 may vary in various embodiments. The length of the delay section may thus also be varied and the length of a measurement section depending on the number of bits of the frequency division counter 302.

In various embodiments, the frequency division counter 308 may comprise a number or memory elements, such as D flip flops, where the number of flip flops corresponds to the number of bits of the frequency division counter 308. For example, the frequency division counter 308 may comprise 8 memory elements to conduct an 8 bit count. Each bit of the count may be provided an corresponding output. When the dynamic counter 204 is enabled by the enable signal 414, which may be carried by the output of AND gate 411 in various embodiments, a first memory element of the frequency division counter 308 may receive the test write-data transition signal at a clock input of the first memory element.

In various embodiments, the dynamic clock gating circuit 306 may be integrated with the frequency division counter 308. For example, memory element 310 may also comprise the first memory element of the frequency division counter 308. The output of NAND gate 413 may be provided to a clock input of memory element 310. The output of the memory element may be inverted and provided to the data input of a second memory element 416 of the frequency division counter 308. The output of the memory element 310 of the frequency division counter 308 may also be provided to the input of MUX 312. And, the output 312A of the MUX 312 may be provided to the data input of the memory element 310. As already discussed the output 106C may be coupled with selection input 312B of the MUX 312. Additional memory elements corresponding to additional bits may be coupled in a chain with the inverted outputs of the memory elements being fed back to the data inputs of the respective memory elements and being coupled with the clock inputs of the next memory elements in the chain. The frequency division counter 308 may also comprise a reset input 309, that, when asserted may reset the state of all the memory elements of the frequency division counter 308. As will be appreciated, the frequency division counter 308 may be reset before a calibration test or in between iterations of calibration test to restart the count.

FIG. 5 depicts a system to write to a hard disk drive in accordance with an embodiment.

The system 500 to write to a hard disk drive may comprise a system on chip 502 and a preamplifier 100. The system on chip 502 may comprise a voltage source 504, a first digital-to-time converter 506, a second digital-to-time converter 508, and a memory 510. The first digital-to-time converter 506 and the second digital-to-time converter 508 may comprise ring oscillators. The current source may produce a current overshoot data signal and write-data transition signal. When performing writing operations, these signals may depend on the data to be written. For calibration, these signals may depend on test pattern data stored in a memory 510

The first digital time converter and second digital time converter may implement a delay between the current-overshoot data signal and the write-data transition signal. The delay may depend on a skew stored in memory 510. The current-overshoot data signal and the write-data transition signal may comprise differential signals. These may be provided to receivers (not depicted in FIG. 5) and on to their respective paths and to the memory element 106 of the preamplifier 100. The current-overshoot data signal may be provided to data input 106A and the write-data transition signal to strobe input 106B. The write-data transition signal may strobe the current-data overshoot signal and a strobed current-overshoot signal may be provided to current-write circuit 108. The write-data transition signal may also drive switch 503 to change the current in a write coil 505 for encoding transitions on a hard disk drive. The current-write circuit 108 may adjust magnitude of current through the write coil 505 depending on the strobed signal output from output 106C using current source 501. Drive switch 503 may comprise an H-bridge circuit to allow current direction to be reversed. The current-write circuit 108 may also comprise and H-bridge circuit to allow current overshoot provided to be reversed.

The voltage source 504 may be controlled by a processor 512. The processor may be in communication with other components of the system on chip 502 by internal bussing. The processor may also be in communication with the calibration circuit no and may provide preamble selection signals, and calibration enable signals to begin and configure calibration tests. The processor may also receive results of calibration tests and process the data to determine how and whether to adjust the skew.

Figure 6:
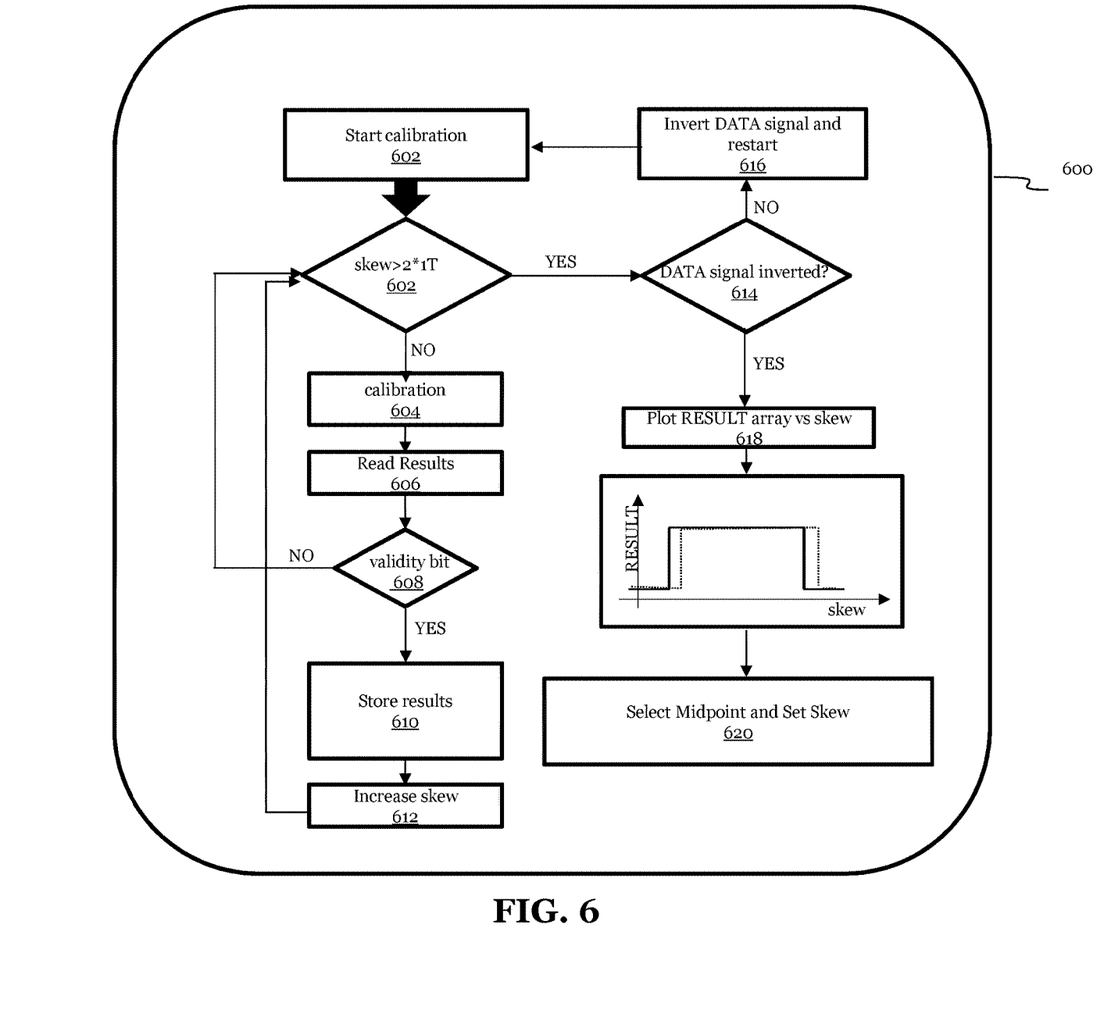
FIG. 6 depicts a method for determining relative time skew between a current-overshoot data signal and a write-data transition signal in accordance with embodiments

FIG. 6 depicts a method for determining relative time skew between a current-overshoot data signal and a write-data transition signal in accordance with embodiments.

In various embodiments, the method 600 may be executed by processor 512. At step 602, the calibration test may be initiated. This may comprise delivering a calibration-enable signal to calibration circuit 110. At initiation, the skew may be set to 0 pS. At a step 602, the method 600 may comprise comparing the skew with a time reference to determine whether a calibration test has been completed. For example, in various embodiments, the skew may be compared with 2*1T. This may allow a broad range of potential time delays to be tested so that maximum boundary and minimum boundary for compatible time delays may be identified. As will be appreciated, the number of iterations to complete a test may depend on the size of increments of the skew between iterations and the time reference used for comparison at step 602.

If the skew is less than the time reference, for example 2*1T, the method 600 may progress to step 604, where calibration patterns are generated and provided to the preamplifier 100. The calibration patterns may determine the test write-data transition signal and the test current-overshoot signal. Additional data, such as preamble selection signals may also be provided at this step. At step, 606 the results of the calibration test or iteration of the calibration test are received from the preamplifier 100. The results may comprise the count accrued by frequency division counter 308 and the validity bit. The results, in various embodiments, may comprise a single bit indicating whether or not all pulses of the test data-write transition signal may be captured by memory element 106. At a step 608, the method 600 may comprise determining if the validity bit has been asserted. If it has not, then valid results have not been generated and the method may be returned to step 602. If the validity bit has been set, the method may advance to step 610. At step 610, the results are stored. The location may depend on whether a negative edge or positive edge test is being performed. In various embodiments, results may be stored in memory 510. Memory 510 may comprise different locations results from a rising-edge iteration and results from a falling-edge iteration. At step 612, the size of the skew for the next iterations may be incremented. In various embodiments, the size of the increment may be a set value. For example, the skew may be set equal to skew plus 10 pS in some embodiments. After completion of step 612, the method boo may return to step 602. Additional iterations may be performed and skew incremented until the skew exceeds the time reference.

If the skew is greater than the time reference, for example 2*1T at step 602, the method may advance to step 614. At step 614, it may be determined whether the data signal has been inverted. If not, the method may advance to step 616 where the data signal is inverted for testing the falling edge and the method returns to step 602. The skew may be reset to 0 pS so a range for the negative edge may be determined.

If, at step 614, the data signal has been inverted, results for the positive edge and negative edge may be plotted at step 618. At step 620, a midpoint may be calculated based on the results and the skew is set to the midpoint between a minimum delay where all pulses are detected and a maximum delay where all pulses are detected. The midpoint may be set as the skew for the preamplifier 100 to synchronize the signals provided to memory element 106.

Figure 7:
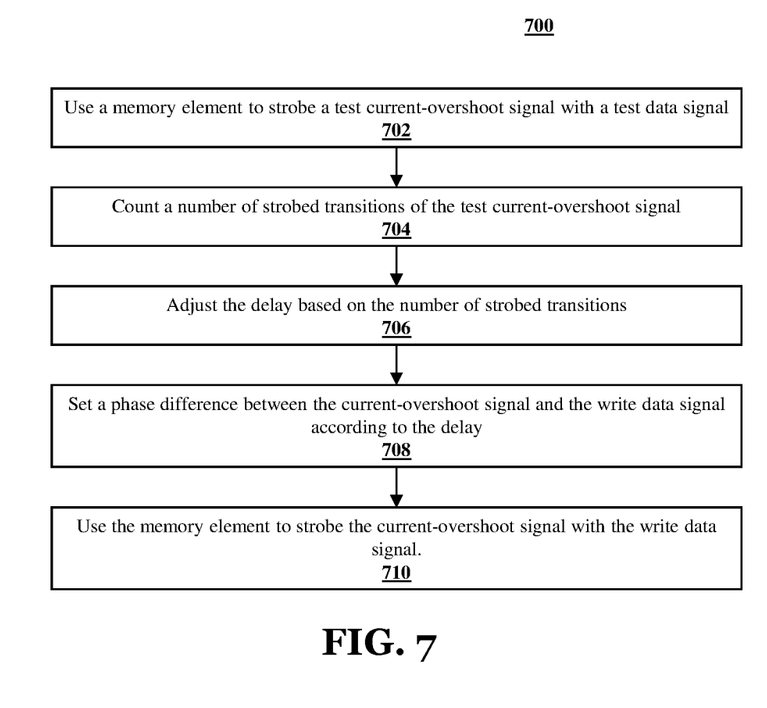
FIG. 7 depicts a method to determine a relative delay between a current-overshoot signal and a write data signal for a hard disk drive preamplifier of an embodiment.

FIG. 7 depicts a method to determine a relative delay between a current-overshoot signal and a write data signal for a hard disk drive preamplifier of an embodiment.

In various embodiments, the method 700 may comprise at a step 702, using a memory element to strobe a test current-overshoot signal with a test data signal; at a step 704, counting a number of strobed transitions of the test current-overshoot signal; at a step 706, adjusting the delay based on the number of strobed transitions; at a step 708 setting a phase difference between the current-overshoot signal and the write data signal according to the delay; and at a step 710, using the memory element to strobe the current-overshoot signal with the write data signal.

In various embodiments, the method 700 may further comprise using the write data signal to drive transitions of a write current to write to a hard disk drive.

In various embodiments, the method 700 may further comprise using the current-overshoot signal to drive current overshoots for the write current to write to the hard disk drive.

The method of claim 2, further comprising using the current-overshoot signal to drive current overshoots for the write current to write to the hard disk drive.

In various embodiments, the method 700 may further comprise wherein the test data signal duplicates the test current-overshoot signal.

In various embodiments, the method 700 may further comprise counting a number of transitions of a preamble of the test data signal and delaying the counting of the number of strobed transitions of the test current-overshoot signal until the number of transitions of the preamble has passed.

In various embodiments, the method 700 may further comprise setting a phase difference between the test current-overshoot signal and the test data signal and iteratively adjusting the phase difference between the test current-overshoot signal and the test data signal using the memory element to strobe the test current-overshoot signal with the test data signal for each iteration and counting the strobed transitions of each iteration.

In various embodiments, the method 700 may further comprise identifying a delay range from the counts of each iteration where each transition of the test current-overshoot signal is strobed by the test data signal.

In various embodiments, the method 700 may further comprise, wherein the number of strobed transitions comprises negative edge transitions, positive edge transitions, or both.

Example 1. A method to determine a relative delay between a current-overshoot signal and a write data signal for a hard disk drive preamplifier, the method including: using a memory element to strobe a test current-overshoot signal with a test data signal; counting a number of strobed transitions of the test current-overshoot signal; adjusting the relative delay based on the number of strobed transitions; setting a phase difference between the current-overshoot signal and the write data signal according to the relative delay; and using the memory element to strobe the current-overshoot signal with the write data signal.

Example 2. The method of Example 1, further including using the write data signal to drive transitions of a write current to write to a hard disk drive.

Example 3. The method of Example 1 or Example 2, further including using the current-overshoot signal to drive current overshoots for the write current to write to the hard disk drive.

Example 4. The methods of Example 1 through Example 3, wherein the test data signal duplicates the test current-overshoot signal.

Example 5. The methods of Example 1 through Example 4, further including counting a number of transitions of a preamble of the test data signal and delaying the counting of the number of strobed transitions of the test current-overshoot signal until the number of transitions of the preamble has passed.

Example 6. The methods of Example 1 through Example 5, further including setting a phase difference between the test current-overshoot signal and the test data signal and iteratively adjusting the phase difference between the test current-overshoot signal and the test data signal using the memory element to strobe the test current-overshoot signal with the test data signal for each iteration and counting the strobed transitions of each iteration.

Example 7. The methods of Example 1 through Example 6, further including identifying a delay range from the counts of each iteration where each transition of the test current-overshoot signal is strobed by the test data signal.

Example 8. The methods of Example 1 through Example 7, wherein the number of strobed transitions includes negative edge transitions, positive edge transitions, or both.

Example 9. A preamplifier for a hard disk driver, the preamplifier including a memory element including a data input, a strobe input, and a data output, the memory element being configured to strobe a data signal received at the data input with a strobe signal received at the strobe input and configured to output a strobed signal at the output; a current-write circuit configured to receive the strobed signal and generate an overshoot current depending on the strobed signal; and a calibration circuit coupled with the data output and configured to count transitions in the strobed signal.

Example 10. The preamplifier of Example 9, wherein the calibration circuit includes a dynamic counter and an enablement counter, the dynamic counter being coupled with the enablement counter to receive an enable signal from the enablement counter, the enablement counter being configured to count transitions of the strobe signal and assert the enablement signal.

Example 11. The preamplifier of Example 9 or Example 10, wherein the dynamic counter includes a frequency-division counter and a dynamic clock gating circuit.

Example 12. The preamplifiers of Example 9 through Example 11, wherein the frequency-division counter receives the strobe signal at a clock input and receives an output of the dynamic clock gating circuit at a counter data input, further wherein the output of the dynamic clock gating circuit is toggled between a clock-increment state and a clock-hold state by the strobed signal.

Example 13. The preamplifiers of Example 9 through Example 12, wherein the enablement counter includes a frequency-division counter coupled at a clock input with the strobe signal and an output of the frequency-division counter being coupled with a enablement-calibration circuit, the enablement-calibration circuit being configured to inhibit assertion of the enablement signal until the frequency-division counter counts to a predetermined number.

Example 14. A preamplifier for a hard disk driver, the preamplifier including: a memory element including a data input, a strobe input, and a data output, the memory element being configured to strobe a data signal received at the data input with a strobe signal received at the strobe input and configured to output a strobed signal at the output; and a calibration circuit coupled with the data output and configured to count transitions in the strobed signal, the calibration circuit including, an enablement counter configured to count transitions of the strobe signal and assert an enable signal in response to a count of the strobe signal exceeding a predetermined number, and a dynamic counter being coupled with the enablement counter to receive the enable signal from the enablement counter, the enablement counter being configured to count transitions of the strobed signal while the enable signal is asserted.

Example 15. The preamplifier of Example 14, wherein the enablement counter includes a frequency-division counter and an enablement-calibration circuit, the frequency-division counter coupled at a clock input with the strobe signal and an output of the frequency-division counter being coupled with the enablement-calibration circuit, the enablement-calibration circuit being configured to assert the enable signal when the count of the strobe signal exceeds the predetermined number.

Example 16. The preamplifier of Example 14 or Example 15, wherein the frequency-division counter includes a pre-load input to pre-load an initial value into the frequency-division counter for the count of the strobe signal.

Example 17. The preamplifiers of Example 14 through Example 16, wherein the enablement-calibration circuit receives a preamble selection signal to set the predetermined number.

Example 18. The preamplifiers of Example 14 through Example 17, wherein the enablement-calibration circuit is configured to de-assert the enable signal after the enable signal has been enabled for a set number of transitions of the strobe signal.

Example 19. The preamplifiers of Example 14 through Example 18, wherein the frequency-division counter includes a ten-bit counter.

Example 20. The preamplifiers of Example 14 through Example 19, wherein the enablement counter includes a single frequency division counter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method to determine a relative delay between a current-overshoot signal and a write data signal for a hard disk drive preamplifier, the method comprising:
    using a memory element to strobe a test current-overshoot signal with a test data signal;
    counting a number of strobed transitions of the test current-overshoot signal;
    adjusting the relative delay based on the number of strobed transitions;
    setting a phase difference between the current-overshoot signal and the write data signal according to the relative delay; and
    using the memory element to strobe the current-overshoot signal with the write data signal.

2. The method of claim 1, further comprising using the write data signal to drive transitions of a write current to write to a hard disk drive.

3. The method of claim 2, further comprising using the current-overshoot signal to drive current overshoots for the write current to write to the hard disk drive.

4. The method of claim 1, wherein the test data signal duplicates the test current-overshoot signal.

5. The method of claim 1, further comprising counting a number of transitions of a preamble of the test data signal and delaying the counting of the number of strobed transitions of the test current-overshoot signal until the number of transitions of the preamble has passed.

6. The method of claim 1, further comprising setting a phase difference between the test current-overshoot signal and the test data signal and iteratively adjusting the phase difference between the test current-overshoot signal and the test data signal using the memory element to strobe the test current-overshoot signal with the test data signal for each iteration and counting the strobed transitions of each iteration.

7. The method of claim 6, further comprising identifying a delay range from the counts of each iteration where each transition of the test current-overshoot signal is strobed by the test data signal.

8. The method of claim 1, wherein the number of strobed transitions comprises negative edge transitions, positive edge transitions, or both.

9. A preamplifier for a hard disk driver, the preamplifier comprising:
 a memory element comprising a data input, a strobe input, and a data output, the memory element being configured to strobe a data signal received at the data input with a strobe signal received at the strobe input and configured to output a strobed signal at the output;
 a current-write circuit configured to receive the strobed signal and generate an overshoot current depending on the strobed signal; and
 a calibration circuit coupled with the data output and configured to count transitions in the strobed signal.

10. The preamplifier of claim 9, wherein the calibration circuit comprises a dynamic counter and an enablement counter, the dynamic counter being coupled with the enablement counter to receive an enable signal from the enablement counter, the enablement counter being configured to count transitions of the strobe signal and assert the enablement signal.

11. The preamplifier of claim 10, wherein the dynamic counter comprises a frequency-division counter and a dynamic clock gating circuit.

12. The preamplifier of claim 11, wherein the frequency-division counter receives the strobe signal at a clock input and receives an output of the dynamic clock gating circuit at a counter data input, further wherein the output of the dynamic clock gating circuit is toggled between a clock-increment state and a clock-hold state by the strobed signal.

13. The preamplifier of claim 10, wherein the enablement counter comprises a frequency-division counter coupled at a clock input with the strobe signal and an output of the frequency-division counter being coupled with a enablement-calibration circuit, the enablement-calibration circuit being configured to inhibit assertion of the enablement signal until the frequency-division counter counts to a predetermined number.

14. A preamplifier for a hard disk driver, the preamplifier comprising:
 a memory element comprising a data input, a strobe input, and a data output, the memory element being configured to strobe a data signal received at the data input with a strobe signal received at the strobe input and configured to output a strobed signal at the output; and
 a calibration circuit coupled with the data output and configured to count transitions in the strobed signal, the calibration circuit comprising,
  an enablement counter configured to count transitions of the strobe signal and assert an enable signal in response to a count of the strobe signal exceeding a predetermined number, and
  a dynamic counter being coupled with the enablement counter to receive the enable signal from the enablement counter, the enablement counter being configured to count transitions of the strobed signal while the enable signal is asserted.

15. The preamplifier of claim 14, wherein the enablement counter comprises a frequency-division counter and an enablement-calibration circuit, the frequency-division counter coupled at a clock input with the strobe signal and an output of the frequency-division counter being coupled with the enablement-calibration circuit, the enablement-calibration circuit being configured to assert the enable signal when the count of the strobe signal exceeds the predetermined number.

16. The preamplifier of claim 15, wherein the frequency-division counter comprises a pre-load input to pre-load an initial value into the frequency-division counter for the count of the strobe signal.

17. The preamplifier of claim 15, wherein the enablement-calibration circuit receives a preamble selection signal to set the predetermined number.

18. The preamplifier of claim 15, wherein the enablement-calibration circuit is configured to de-assert the enable signal after the enable signal has been enabled for a set number of transitions of the strobe signal.

19. The preamplifier of claim 15, wherein the frequency-division counter comprises a ten-bit counter.

20. The preamplifier of claim 14, wherein the enablement counter comprises a single frequency division counter.

* * * * *